US009659250B2

(12) United States Patent
Shibuya et al.

(10) Patent No.: US 9,659,250 B2
(45) Date of Patent: May 23, 2017

(54) FACILITY STATE MONITORING METHOD AND DEVICE FOR SAME

(75) Inventors: Hisae Shibuya, Tokyo (JP); Shunji Maeda, Tokyo (JP)

(73) Assignee: Hitachi Power Solutions Co., Ltd., Hitachi-shi (JP)

( * ) Notice: Subject to any disclaimer, the term of this patent is extended or adjusted under 35 U.S.C. 154(b) by 601 days.

(21) Appl. No.: 14/241,780

(22) PCT Filed: Aug. 31, 2011

(86) PCT No.: PCT/JP2011/069791
§ 371 (c)(1),
(2), (4) Date: May 29, 2014

(87) PCT Pub. No.: WO2013/030984
PCT Pub. Date: Mar. 7, 2013

(65) Prior Publication Data
US 2014/0279795 A1    Sep. 18, 2014

(51) Int. Cl.
*G06N 5/00* (2006.01)
*G06F 1/00* (2006.01)
(Continued)

(52) U.S. Cl.
CPC .......... *G06N 5/02* (2013.01); *G05B 23/0221* (2013.01); *G05B 23/0254* (2013.01);
(Continued)

(58) Field of Classification Search
CPC  G06N 5/02; G06N 5/04; G06N 5/022; G06Q 50/01
See application file for complete search history.

(56) References Cited

U.S. PATENT DOCUMENTS 6,952,662 B2    10/2005    Wegerich et al.
6,975,962 B2    12/2005    Wegerich et al.
(Continued)

FOREIGN PATENT DOCUMENTS

JP    2010-92355 A    4/2010
JP    2010-96873 A    4/2010
(Continued)

OTHER PUBLICATIONS

Stephan W. Wegerich; "Nonparametric Modeling of Vibration Signal Features for Equipment Health Monitoring", Aerospace Conference, 2003, Proceedings. 2003 IEEE, vol. 7, Issue, 2003 pp. 3113-3121 (nine (9) pages total).
(Continued)

*Primary Examiner* — Stanley K Hill
*Assistant Examiner* — Kalpana Bharadwaj
(74) *Attorney, Agent, or Firm* — Crowell & Moring LLP

(57) ABSTRACT

In case-based anomaly indication detection in a facility, there are problems such as error generation due to insufficient learning data or execution difficulty due to increased memory capacity and calculation time when the learning data period has been increased to obtain the learning data sufficiently. Provided is a method for monitoring facility state on the basis of a time series signal outputted from the facility, wherein an operation pattern label for each fixed interval is assigned on the basis of the time series signal, learning data is selected on the basis of the operation pattern label for each fixed interval, a normal model is created on the basis of the selected learning data, an anomaly measure is calculated on the basis of the time series signal and the normal model, and the facility state is determined to be anomaly or normal on the basis of the calculated anomaly measure.

13 Claims, 13 Drawing Sheets

(51) Int. Cl.
*G06N 5/02* (2006.01)
*G05B 23/02* (2006.01)
*G06N 99/00* (2010.01)

(52) U.S. Cl.
CPC . *G06N 99/005* (2013.01); *G05B 2219/32201* (2013.01); *Y02P 90/22* (2015.11)

(56) References Cited

U.S. PATENT DOCUMENTS

| | | | |
|---|---|---|---|
| 8,630,962 B2 | 1/2014 | Maeda et al. | |
| 2007/0156320 A1* | 7/2007 | Breed | B60C 23/0408 701/70 |
| 2011/0064267 A1* | 3/2011 | Cobb | G06K 9/00771 382/103 |
| 2011/0172504 A1* | 7/2011 | Wegerich | A61B 5/0205 600/301 |
| 2012/0041575 A1 | 2/2012 | Maeda et al. | |
| 2012/0166142 A1 | 6/2012 | Maeda et al. | |
| 2012/0271587 A1 | 10/2012 | Shibuya et al. | |
| 2012/0290497 A1 | 11/2012 | Magara et al. | |
| 2012/0290879 A1 | 11/2012 | Shibuya et al. | |
| 2012/0316835 A1 | 12/2012 | Maeda et al. | |
| 2013/0173218 A1 | 7/2013 | Maeda et al. | |
| 2013/0282336 A1 | 10/2013 | Maeda et al. | |

FOREIGN PATENT DOCUMENTS

| | | |
|---|---|---|
| JP | 2010-191556 A | 9/2010 |
| JP | 2011-59790 A | 3/2011 |
| JP | 2011-70635 A | 4/2011 |
| JP | 2011-81697 A | 4/2011 |
| JP | 2011-145846 A | 7/2011 |
| JP | 2011-170724 A | 9/2011 |
| JP | 2012-58890 A | 3/2012 |
| JP | 2012-89057 A | 5/2012 |
| JP | 2012-137934 A | 7/2012 |
| JP | 2012-230703 A | 11/2012 |
| JP | 2013-25367 A | 2/2013 |
| JP | 2013-41448 A | 2/2013 |
| JP | 2013-143009 A | 7/2013 |
| JP | 2013-152655 A | 8/2013 |
| JP | 2013-218725 A | 10/2013 |
| WO | WO 2011/024382 A1 | 3/2011 |

OTHER PUBLICATIONS

International Search Report dated Sep. 27, 2011 w/ English translation (two (2) pages).

* cited by examiner

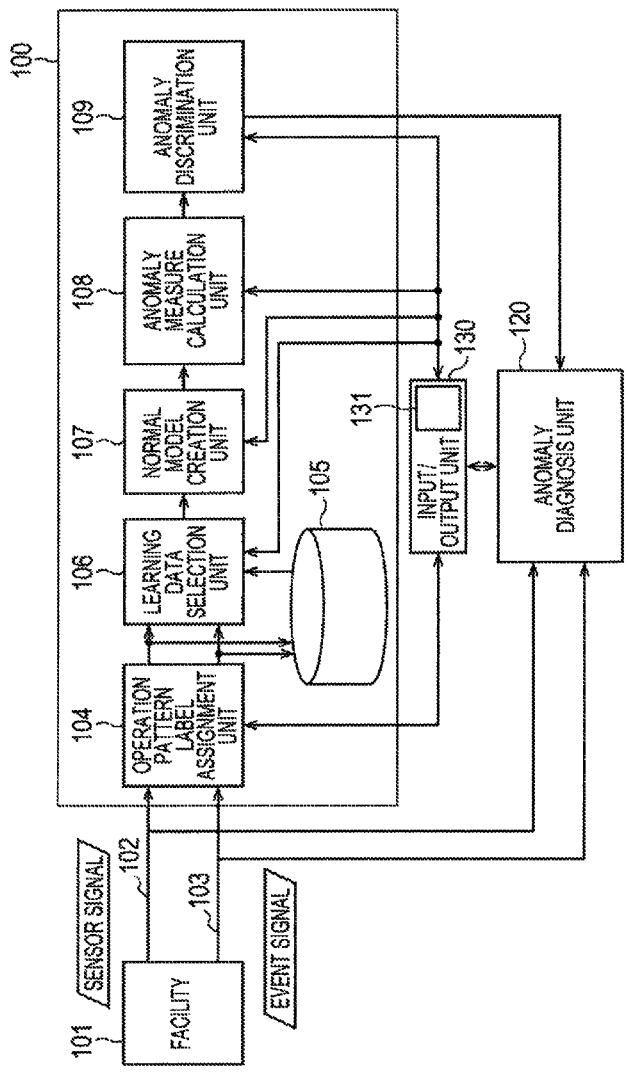

FIG. 2B
| DATE AND TIME | CODE | MESSAGE |
|---|---|---|
| 2/14/2010 17:13:38 | 1231 | Request module on |
| 2/14/2010 17:17:25 | 1249 | Starter on |
| 2/14/2010 17:17:29 | 3225 | Ignition on |
| 2/14/2010 17:17:48 | 1250 | Starter off |
| 2/14/2010 17:17:52 | 2124 | Idle |
| 2/14/2010 17:17:53 | 2136 | Speed setpoint input - internal (DIA.NE) |
| 2/14/2010 17:18:00 | 1233 | Operation on |
| 2/14/2010 17:20:53 | 1256 | Acknowledgement |
| 2/14/2010 17:21:59 | 1234 | Operation off |
FIG. 3A
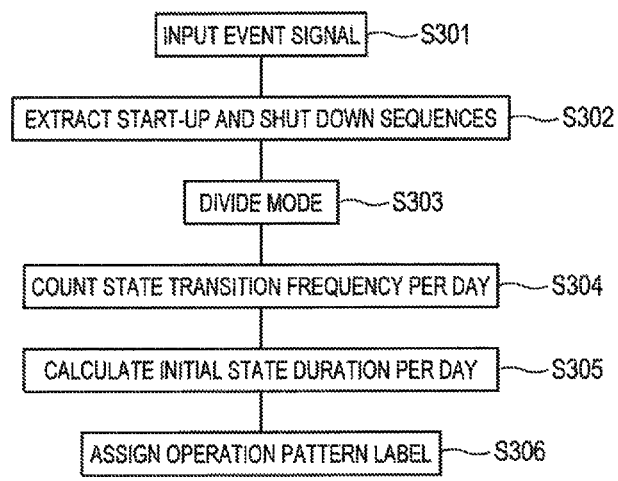
FIG. 3B
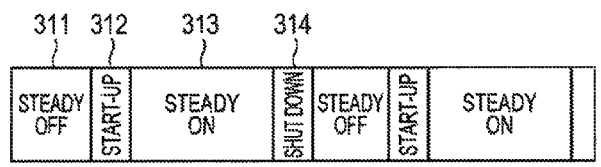

FIG. 4B

| INITIAL STATE ON/OFF | STATE TRANSITION FREQUENCY | | | | | |
|---|---|---|---|---|---|---|
| | 0 | 1 | 2 | 3 | 4 | 5 ≤ |
| DURATION OF INITIAL STATE < 5 | 1/37 | 7/43 | 13/49 | 19/55 | 25/61 | 31/67 |
| < 10 | 2/38 | 8/44 | 14/50 | 20/56 | 26/62 | 32/68 |
| < 20 | 3/39 | 9/45 | 15/51 | 21/57 | 27/63 | 33/69 |
| < 30 | 4/40 | 10/46 | 16/52 | 22/58 | 28/64 | 34/70 |
| < 40 | 5/41 | 11/47 | 17/53 | 23/59 | 29/65 | 35/71 |
| 40 ≤ | 6/42 | 12/48 | 18/54 | 24/60 | 30/66 | 36/72 |

FIG. 5A

| DATE (501) | SITE (502) | SERIAL NUMBER (503) | LABEL (504) | DATA key (505) | INITIAL STATE (506) | DURATION (507) | TRANSITION FREQUENCY (508) | WITH/WITHOUT WARNING (509) |
|---|---|---|---|---|---|---|---|---|
| 01.01.2007 | C288 | 1 | 13 | 1 | ON | 0 | 2 | WITHOUT |
| 01.02.2007 | C288 | 1 | 22 | 2 | ON | 23.1 | 3 | WITHOUT |
| 01.03.2007 | C288 | 1 | 50 | 3 | OFF | 7.1 | 2 | WITHOUT |

FIG. 5B

| key (511) | TIME (512) | SENSOR 1 | SENSOR 2 | SENSOR 3 | SENSOR 4 | SENSOR 5 | |
|---|---|---|---|---|---|---|---|
| 1 | 0:00:00 | 27935 | 478 | 179.9 | 14.6 | 1.18 | ... |
| 1 | 0:00:30 | 27935 | 478 | 179.8 | 14.6 | 1.17 | ... |
| ⋮ | ⋮ | ⋮ | ⋮ | ⋮ | ⋮ | ⋮ | ... |

FIG. 5C

| key | TIME | CODE | MESSAGE |
|---|---|---|---|
| 1 | 17:13:38 | 1231 | Request module on |
| 1 | 17:17:25 | 1249 | Starter on |
| 1 | 17:17:29 | 3225 | Ignition on |
| 1 | 17:17:48 | 1250 | Starter off |
| 1 | 17:17:52 | 2124 | Idle |
|   |   |   |   |

| DATE | SITE | SERIAL NUMBER | LABEL | DATA key | PREVIOUS STATE | DURATION | CURRENT STATE | WITH/ WITHOUT WARNING |
|---|---|---|---|---|---|---|---|---|
| 01.01.2009 | C288 | 1 | 1 | 1 | OFF | 0 | OFF | WITHOUT |
| 01.01.2009 | C288 | 1 | 2 | 2 | OFF | 9.7 | ON | WITHOUT |
| 01.01.2009 | C288 | 1 | 3 | 3 | ON | 12.5 | OFF | WITHOUT |
| 01.02.2009 | C288 | 1 | 1 | 4 | OFF | 1.8 | OFF | WITHOUT |
| 01.02.2009 | C288 | 1 | 2 | 5 | OFF | 9.8 | ON | WITHOUT |

OPERATION PATTERN LABEL ASSIGNMENT REFERENCE INFORMATION — 601

CYCLE: 1 DAY — 602 603

- 604A INFORMATION 1: INITIAL STATE (ON/OFF) — 605A  NUMBER OF CLASSES: 2 DETAILS — 607A 608A
- 604B INFORMATION 2: STATE TRANSITION FREQUENCY — 605B  NUMBER OF CLASSES: 6 DETAILS — 607B 608B
- 604C INFORMATION 3: — 605C  NUMBER OF CLASSES: DETAILS — 607C 608C

Dropdown 606:
- STATE TRANSITION FREQUENCY
- INITIAL STATE (ON/OFF)
- INITIAL STATE DURATION
- TOTAL NUMBER OF ON HOURS
- WITH/WITHOUT MAINTENANCE WORK (WITH/WITHOUT)
- WITH/WITHOUT WARNING (WITH/WITHOUT)

609 ADDITION  610 LABEL DEFINITION

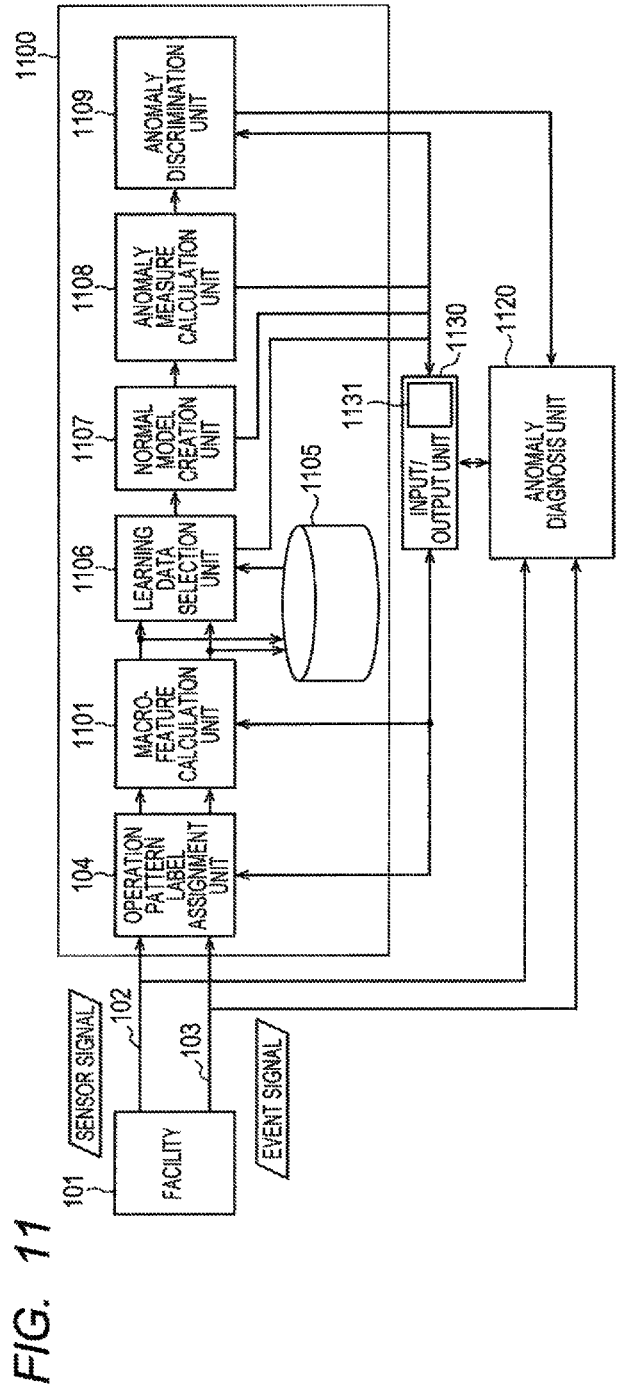

FACILITY STATE MONITORING METHOD AND DEVICE FOR SAME

BACKGROUND

The present invention relates to a facility state monitoring method of early detecting an anomaly on the basis of multidimensional time series data output from a plant, a facility and so forth and a device for same.

A power company supplies district heating hot water and supplies high pressure steam and low pressure steam to factories by utilizing waste heat and so forth of a gas turbine. A petrochemical company operates the gas turbine and so forth as a power supply facility. In various plants and facilities using the gas turbines and so forth as described above, preventive maintenance that a malfunction of a facility or a symptom thereof is detected is remarkably important also in order to minimize the damage to society.

Facilities which require such preventive maintenance as mentioned above as for degradation, life and so forth of batteries loaded thereon are too numerous to enumerate such as not only gas turbines and steam turbines but also water wheels in hydraulic power plants, nuclear reactors of nuclear power plants, windmills of wind farms, engines of airplanes and heavy machines, railroad vehicles and railroad tracks, escalators, elevators, and also equipment and component levels.

Therefore, it is conducted to attach a plurality of sensors to object facilities and plants so as to determine whether they are normal or anomaly in accordance with a monitoring standard for each sensor. In U.S. Pat. No. 6,952,662 (Patent Document 1) and U.S. Pat. No. 6,975,962 (Patent Document 2), anomaly detecting methods mainly targeted at engines are disclosed. This is the one that past data, for example, time series sensor signals are held as database, the degree of similarity between observation data and past leaning data is calculated by an original method, an estimated value is calculated by linear combination of pieces of data which are high in degree of similarity, and the degree of difference between the estimated value and the observation data is output. In addition, in Japanese Patent Application laid-Open No. 2010-191556 (Patent Document 3), an anomaly detecting method of extracting a compact learning data set which is similar to observation data from past normal data, modeling the extracted learning data in a sub-space, and detecting an anomaly on the basis of a distance between the observation data and the sub-space is disclosed.

CITATION LIST

Patent Document

Patent Document 1: U.S. Pat. No. 6,952,662
Patent Document 2: U.S. Pat. No. 6,975,962
Patent Document 3: Japanese Patent Application Laid-Open No. 2010-191556

Non Patent Document

Non Patent Document 1: Stephan W. Wegerich; Nonparametric modeling of vibration signal features for equipment health monitoring, Aerospace Conference, 2003, Proceedings. 2003 IEEE, Volume 7, Issue, 2003 Page(s): 3113-3121

SUMMARY

According to the methods described in Patent Document 1 and Patent Document 2, when pieces of observation data which are not in learning are observed, it is possible to detect them as anomalies by assigning normal-time data as the learning data. However, anomaly detection performance thereof greatly depends on the quality of the learning data. That is, observation data which is not in the learning data is decided to be anomaly even when it is normal, on the other hand when an anomaly is erroneously mixed into the learning data, a possibility that it may be decided to be normal even when it is anomaly is generated. Therefore, although reliability of anomaly detection will be remarkably reduced unless learning data of only normal states are accurately and comprehensively collected, to perform such learning data collection on a facility having diverse normal states is highly heavy-loaded and it is substantially impossible to perform this by the man power in many cases. Further, even though it is possible to collect high quality learning data, since it is the method which is high in calculation load, the data volume permitted to be processed in a realizable computational time is small and as a result, in many case, it becomes impossible to ensure comprehensiveness.

According to the method described in Patent Document 3, although the quality of the leaning data is important similarly, since the compact learning data set which is similar to the observation data is extracted, the calculation load can be reduced and it becomes easy to ensure the comprehensiveness. However, in a case where data in a fixed period has been set as the learning data, when a facility which is complicated in operation and shut down patterns is handled as an object, such a case occurs that similar data is not found due to learning data insufficiency and a false alarm that normality is decided as anomaly is generated. When the period of the learning data is increased until learning data insufficiency is resolved, the memory capacity and the calculation time are increased and execution becomes difficult. In addition, in a case where the state is largely changed due to maintenance work or the like even when the operation pattern is not changed, if the data in the fixed period is set as the learning data, such a case may occur that that state change is detected as the anomaly and the error is generated.

In addition, although in conventional case-based anomaly symptom detection in a facility, comprehensive collection of diverse normal states is needed, since the state greatly differs depending on the operation pattern such as the length of shut down time, there is such a problem that the error is generated due to learning data insufficiency. In addition, when the learning data period is increased until learning data insufficiency is resolved, there is such another problem that the memory capacity and the calculation time are increased and execution becomes difficult.

Accordingly, an object of the present invention is to provide facility state monitoring method and system provided with an anomaly detecting method solving the above-mentioned problems and allowing highly sensitive anomaly detection even for a facility which is complicated in operation and shut down patterns such as in a plant and a facility or manufacturing equipment and measuring equipment (in the following, they will be generally referred to as a facility) and so forth while keeping the calculation load low, and to provide a facility monitoring method and a device therefor capable of realizing highly sensitive anomaly detection by selecting appropriate learning data even when there is a change in state due to the maintenance work in addition to the changes in operation and shut down patterns.

In order to attain the above-mentioned object, in the present invention, in a method of monitoring a state of a facility on the basis of a time series signal that the facility outputs, including the steps of, assigning an operation pattern label for each fixed interval on the basis of the time series signal, selecting learning data on the basis of the operation pattern label for each fixed interval, creating a normal model on the basis of this selected learning data, calculating an anomaly measure on the basis of the time series signal and the normal model, and discriminating whether the facility state is anomaly or normal on the basis of the calculated anomaly measure.

In addition, in the present invention, in a method of monitoring a state of a facility on the basis of a time series signal that the facility or a device outputs, including the steps of, assigning an operation pattern label which has been categorized to a finite number to a time series signal for each fixed interval, accumulating the time series signal to which the operation pattern label has been assigned in the operation pattern label assigning step as data, selecting a predetermined number of pieces of data on the basis of the operation pattern label assigned to the time series signal from within the data accumulated in the data accumulating step and setting them as learning data, creating a normal model by using the learning data selected in the learning data selecting step, calculating an anomaly measure of the time series signal on the basis of comparison with the normal model created in the normal model creating step, and discriminating an anomaly on the basis of the anomaly measure calculated in the anomaly measure calculating step.

In addition, in the present invention, in a device for monitoring a facility state provided with a sensor signal analysis unit that inputs and analyzes a time series signal output from a facility or a device, an anomaly diagnosis unit that receives a result of analysis by the sensor signal analysis unit and the time series signal and diagnoses anomaly of the facility, and an input/output unit connected with the sensor signal analysis unit and the anomaly diagnosis unit to perform data input/output, wherein the sensor signal analysis unit has an operation pattern label assigning sub-unit that assigns an operation pattern label for each fixed interval on the basis of the time series signal output from the facility or the device, a learning data creating sub-unit that selects learning data on the basis of the operation pattern label for each fixed interval assigned by the operation pattern label assigning sub-unit, a normal model creating sub-unit that creates a normal model on the basis of the learning data created by the learning data creating sub-unit, an anomaly measure calculating sub-unit that calculates an anomaly measure of the time series signal output from the facility or the device on the basis of the normal model created by the normal model creating sub-unit, and an anomaly discriminating sub-unit that performs discrimination as to whether a state of the facility is anomaly or normal on the basis of the anomaly measure calculated by the anomaly measure calculating sub-unit.

Further, in the present invention, in a device for inputting a time series signal output from a facility or a device and monitoring a state of the facility, it is configured by being provided with an operation pattern label assigning unit that inputs a time series signal and assigns an operation pattern label which has been categorized to a finite number for each fixed interval to the externally input time series signal, a data accumulating unit that accumulates the time series signal to which the operation pattern label has been assigned by this operation pattern label assigning unit, a learning data selection unit that selects pieces of data of the same operation pattern label or operation pattern labels which are close in state from within the data accumulated in the data accumulating unit on the basis of the label assigned to the time series signal by the operation pattern label assigning unit by a predetermined number and setting them as learning data, a normal model creation unit that creates a normal model using the learning data selected by the learning data selecting unit, an anomaly measure calculating unit that calculates an anomaly measure of the time series signal by comparing the time series signal to which the operation pattern label has been assigned by the operation pattern label assigning unit with the normal model created by the normal model creating unit, and an anomaly discriminating unit that discriminates anomaly of the time series signal to which the operation pattern label has been assigned on the basis of the anomaly measure calculated by the anomaly measure calculating unit.

According to the present invention, since the operation pattern label is assigned to the data for each fixed interval and pieces of data in the period of the same label or the labels which are close in state are collected by the predetermined number and set as the learning data, the highly accurate normal model can be created without increasing the calculation load and the error that normality is decided as anomaly can be reduced.

Further, according to the present invention, since a macro-feature indicating a macro fluctuation of sensor data is calculated and pieces of data in the period of the same label or the labels which are close in state and similar in macro-feature are collected by the predetermined number and set as the learning data, it becomes possible to create the highly accurate normal model by selecting the similar learning data even in a case where the state has been greatly changed by maintenance work and so forth and the error that normality is decided as anomaly can be reduced.

Owing to the above, there can be implemented a system coping with both of highly sensitive anomaly detection and ready anomaly description in various facilities and components, as for degradation, life and so forth of batteries loaded thereon, not only the facilities such as the gas turbines, the steam turbines and so forth, but also the water wheels in the hydraulic power plants, the nuclear reactors of the nuclear power plants, the windmills of the wind farms, the engines of the airplanes and the heavy machines, the railroad vehicles and railroad tracks, the escalators and the elevators, and the equipment and component levels.

BRIEF DESCRIPTION OF THE DRAWINGS

FIG. 1 is a block diagram showing a schematic configuration of a facility state monitoring system in a first embodiment of the present invention.

FIG. 2A is a signal list showing examples of sensor signals in the first embodiment of the present invention.

FIG. 2B is a signal list showing examples of event signals in the first embodiment of the present invention.

FIG. 3A is a flowchart showing a flow of an operation pattern label assigning process in the first embodiment of the present invention.

FIG. 3B is a schematic diagram of mode division showing a state that a movable state of a facility is divided and classified into any of four modes in the first embodiment of the present invention.

FIG. 4B is a diagram showing an example of a relation between data calculated from the event signal and operation pattern labels in the first embodiment of the present invention.

FIG. 5A is a data list showing an example of operation pattern label management data in the first embodiment of the present invention.

FIG. 5B is a data list showing an example of sensor signal data in the first embodiment of the present invention.

FIG. 5C is a data list showing an example of event signal data in the first embodiment of the present invention.

FIG. 5D is a data list showing another example of the operation pattern label management data in the first embodiment of the present invention.

FIG. 6A is an example of an information input screen for determining label assignment conditions in the first embodiment of the present invention.

FIG. 11 is a block diagram showing a schematic configuration of a facility state monitoring system in a second embodiment of the present invention.

FIG. 12 is an example of an information input screen for determining label assignment conditions in the second embodiment of the present invention.

DESCRIPTION OF THE PREFERRED EMBODIMENTS

Figure 4A:
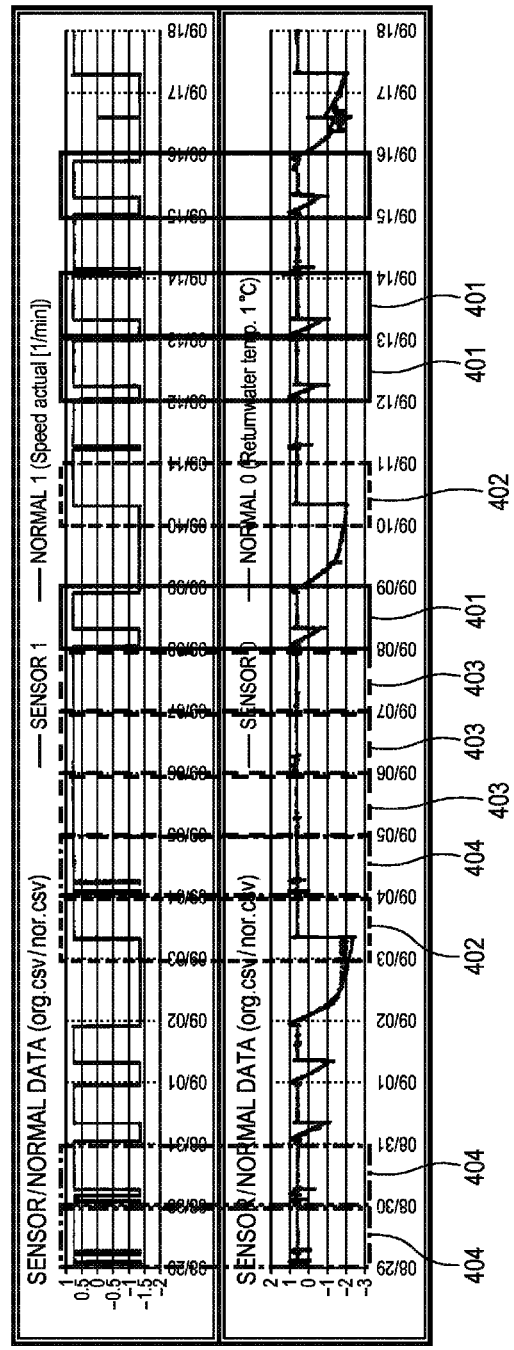
FIG. 4A is a diagram explaining the concept of operation pattern label assignment in the first embodiment of the present invention.

In the following, contents of the present invention will be described in detail using the drawings.

Embodiment 1

One configuration example of a system for embodying a facility state monitoring method of the present invention is shown in FIG. 1. The present system is configured by being provided with a sensor signal analysis unit 100 and an anomaly diagnosis unit 120, and an input/output unit 130.

The sensor signal analysis unit 100 of the present system is configured by being provided with an operation pattern label assignment unit 104 that assigns an operation pattern label for each fixed interval on the basis of a sensor signal 102 and an event signal 103 output from a facility 101, a database 105 that accumulates the sensor signal 102 and the event signal 103 to which the operation pattern label has been assigned, a learning data selection unit 106 that receives the sensor signal 102 and the event signal 103 and selects learning data from the sensor signal 102 and the event signal 103 so accumulated on the basis of the operation pattern label, a normal model creation unit 107 that creates a normal model using the selected learning data, an anomaly measure calculation unit 108 that calculates an anomaly measure on the basis of the normal model and the sensor signal, and an anomaly discrimination unit 109 that detects anomaly on the basis of the calculated anomaly measure.

The anomaly diagnosis unit 120 receives the sensor signal 102 and the event signal 103 and an output from the anomaly discrimination unit 109 and diagnoses the anomaly of the facility 101.

The input/output unit 130 is connected with the operation pattern label assignment unit 104, the anomaly discrimination unit 109, the anomaly diagnosis unit 120 and so forth to input diagnosis conditions and to output a result of diagnosis.

The facility 101 which is an object for state monitoring is a facility and a plant such as a gas turbine, a steam turbine and so forth. The facility 101 outputs the sensor signal 102 and the event signal 103 that indicate its state.

An example of the sensor signal 102 is shown in FIG. 2A. It is constituted of a time and data on values of a plurality of sensors provided on 101 and is a time series signal which is acquired for each fixed interval. In one case, types of sensors reach the number from several hundred to several thousand and they are for, for example, temperatures of a cylinder, oil, cooling water and so forth, pressures of the oil and the cooling water, rotating speed, room temperature, operation time and so forth of a shaft. In another case, it is a control signal for controlling something to a certain value, not just indicating an output and a state.

An example of the event signal 103 is shown in FIG. 2B. It is a signal which is output irregularly so as to indicate operation/malfunction/warning of the facility and is constituted of a time, a unique code indicating the operation/malfunction/warning, and a message character string.

Next, configuration and operation of the sensor signal analysis unit will be described using FIG. 1 to FIG. 10. First, a flow of a process by the operation pattern label assignment unit 104 will be described using FIG. 3A and FIG. 3B. First, the event signal 103 is inputted (S301), and segmentation of start-up and shut down sequences is performed by searching for a predetermined character string or code (S302). They are divided into four operation states of a "steady OFF" mode 311 from an end time of the shat down sequence to a start time of the start-up sequence, a "start-up" mode 312 in the start-up sequence, a "steady ON" mode 313 from an end time of the start-up sequence to a start time of the shat down sequence, and a "shut down" mode 314 in the shat down sequence on the basis of a result thereof as shown in FIG. 3B (S303). In the following description, this division will be called mode division and the kind of the operation state will be called the mode.

For sequence segmentation, a start event and an end event of the sequence are designated in advance and it is segmented while scanning the event signal 103 from top to bottom in the following manner.

(1) In a case where it is not in the middle of the sequence, the start event is searched for. When found, it is set as the start of the sequence.

(2) In a case where it is in the middle of the sequence, the end event is searched for. When found, it is set as the end of the sequence.

Here, the end event includes a designated end event and also a malfunction, a warning and a designated start event. In the case that the sequence is ended other than the designated end event, it is recorded as an anomaly end.

Next, a state transition frequency is counted per previously determined period, for example, per day (S304). State transition means transition between the steady ON and the steady OFF. That is, the frequency of the start-up sequences and the shat down sequences may be counted. Next, it is checked to see whether the first state of the previously determined period is ON/OFF and duration of that state up to that time point is calculated (S305). The start-up sequence or shat down sequence which is the nearest to and before that time is searched for, and when it is the start-up sequence, the state is ON, while when it is the shat down sequence, the state is OFF. A time from the end of that sequence may be calculated as the duration. Next, the operation pattern label is assigned on the basis of the state transition frequency and the first state of the previously determined period and the duration thereof so calculated (S306).

An operation pattern label assigning method will be described using FIG. 4A and FIG. 4B. FIG. 4A is a diagram expressing ON/OFF information of the facility and one sensor signal as a time series graph. It goes without saying that the sensor signal value is varied depending on whether it is ON or OFF and it is also seen that the sensor signal value is greatly varied also depending on the duration of the state and the pattern of state transition. Since a purpose of operation pattern label assignment is to select the ones which are similar in facility state as the learning data, the same label is assigned to data surrounded with, for example, a solid line, a dotted-line, a broken line and a one-dot chain line shown in FIG. 4A. For this purpose, the state transition frequency, and the first state of the previously determined period and the duration thereof calculated in S304 and S305 are utilized.

An example of a relation between these pieces of information and operation pattern labels is shown in FIG. 4B. Different labels are assigned as the state transition frequency is increased from 0 to 1, 2 . . . . However, in order to define the kinds of the labels to a finite number, the ones which are more than a predetermined frequency are handled as the same ones. In this example, frequencies of five and more are put into one. In addition, since the duration is consecutive data, it is classified by providing appropriate delimiters so as to assign respectively different labels thereto. Further, the label which is different depending on whether the first state is ON/OFF is assigned. Looking at corresponding columns of the state transition frequency and the first state duration, when the first state is ON, labels of left numbers (1 to 36 in the example in FIG. 4B) are assigned, while when it is OFF, labels of right numbers (37 to 72 in the example in FIG. 4B) are assigned.

Incidentally, the vertical axis and horizontal axis may be more finely or roughly divided and all pieces of information may not necessarily be used. In addition, still another piece of information may be added to be used for classification. In addition, different labels may not necessarily be allocated to all of the columns. In addition, although in this example, two kinds of states, ON and OFF, are set for the first state, it is also conceivable to distinguish between full shut down and idling states in OFF and to distinguish between different operation modes in ON. It is important to use information relating to whether the facility state is similar thereto or not and it does not mean to limit to the items listed here. For example, it is conceivable to reflect with/without of maintenance work and with/without of a warning on the label.

In addition, although in the present embodiment, an example that mode division is performed using the event signal has been shown, a case where a signal indicating ON/OFF or another operation state of the facility is included in the sensor signal is conceivable. In this case, another piece of information relating to the state transition frequency, the first state of the previously determined period and the duration thereof, or whether the facility state is similar thereto or not may be calculated using that signal.

The sensor signal 102 and the event signal 103 with the operation pattern label assigned are accumulated in the database 105. An example of a management method of data in the database 105 will be described using FIG. 5A to FIG. 5D.

FIG. 5A is an example of management data for the operation pattern labels. In this example, one day from 00:00 o'clock to 24:00 o'clock is defined as the above-mentioned previously determined period and one piece of data is held for each of a date, a site (a code indicating an installation location) and a serial number (an ID for distinguishing a plurality of facilities at the same location). This data is constituted of an operation pattern label 504, a key code 505 to sensor signal data and event signal data, and an initial state 506, an initial state duration 507, a state transition frequency 508 and warning with/without information 509 used for operation pattern label assignment in addition to a date 501, a site 502 and a serial number 503. The items from 506 to 508 are changed in accordance with the operation pattern label assigning method. In addition, when the facility connected to the system is one, the items of the site 502 and the serial number 503 are not needed.

FIG. 5B is the sensor signal data. Although it holds the information which is the same as the output 102 from the facility 101, a key code 511 which is correlated to the key code 505 to the sensor signal data and the event signal data of the management data shown in FIG. 5A is added. Since when once the key code is determined, the date is uniquely determined, information on date may not be included. Time information 512 is needed for correspondence with the event signal. However, in a case where it is ensured that it is fixed period data, serial numbers arranged in acquisition order may be used in place of the time information. FIG. 5C is the event signal data. It is constituted of a code 523 and a message 524 which are the same as those of the output 103 from the facility 101 and a key code 521 and time information 522 correlated to the key code 505 of the management data. Since when once the key code is determined, the date is also determined uniquely, information on date may not be included.

Incidentally, the period of the operation pattern label is not always started at 00:00 o'clock and it may be delimited at an arbitrary time. In addition, the length of the period is not always defined as one day. It would be recommended to make it match a main repetition cycle in order to prevent label assignment from being complicated. For example, although in a power facility or the like by a gas engine, it is proper to define it as one day because it is operated by being adjusted to the operation cycle of an installation that the facility is disposed, it is also conceivable to set it to intervals of twelve hours or eight hours. It is thought that the number of states is reduced to make it easy to collect data of the same state by shortening the cycle. However, when it is intended to maintain the number of pieces of sensor data to be learned constant, the number of pieces of management data to be searched for and the number of pieces of management data to be collected when selecting the sensor data to be learned are increased and therefore the cycle must not be made too short. Although it is also possible to make the cycle longer inversely, attention should be paid to a point that there is a possibility that the number of states is increased and it becomes difficult to collect the data of the same state.

Further, it is also conceivable to delimit the period of operation pattern label management not only at the fixed time but also at a timing of state transition. An example of the pattern label management data in that case is shown in FIG. 5D. This data includes a date 531, a site 532, a serial number 533, an operation pattern label 534, a key code 535 to the sensor signal data and the event signal data and warning with/without information 539 similarly to the example shown in FIG. 5A. In order to newly create data when state transition occurs, as data used for label assignment, information on a previous state 536 of that management period, duration 537 of that state and a state 538 of that management period is held. When the number of classes of the duration of the previous state is set to 6 as in the above, since the number of classes of each of the previous state and the current state is 2, management can be performed with such a reduced number of labels as 24. However, since the numbers of sensor signal data to be correlated to respective pieces of management data are different from one another, in learning data selection, it must be made such that not the number of pieces of management data but the number of sensor signals is set to the predetermined number and thus there is such a demerit that processing therefor becomes complicated.

Figure 6B:
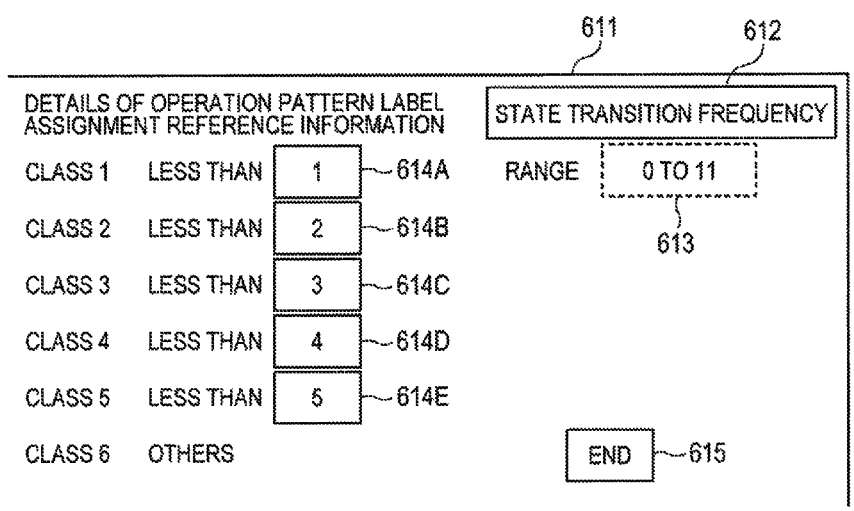
FIG. 6B is an example of a detailed information input screen for determining the label assignment conditions in the first embodiment of the present invention.

Examples of a GUI for determining the length of the period for operation pattern label assignment and rules of label assignment are shown in FIG. 6A to FIG. 6D. The GUI is displayed on a display screen 131 of the input/output unit 130. First, though not shown, the sensor signal and the event signal to be referred to for determination of the rules of label assignment are selected and loaded. Then, an information classification method used for label assignment is determined using an input screen shown in FIG. 6A. FIG. 6A is an example of the input screen for selecting the information used for operation pattern label assignment. A cycle information input window 602, a cycle unit input window 603, reference information selection windows 604A to 604C, number-of-classes input windows 607A to 607C and so forth are included in an operation pattern label assignment reference information input window 601. The period that the operation pattern label is assigned is numerically input into the cycle information input window 602. In addition, the unit of period is selected from a time, a day and a week and input into the cycle unit input window 603. Information used for label assignment is input into the reference information selection windows 604A to 604C.

Since it is assumed that available information is determined in advance and a referenceable information list 606 is displayed by clicking list display buttons 605A to 605C, the available information is selected from the displayed list and is input. The number of classes to which different labels are to be assigned is input into the number-of-classes input windows 607A to 607C on the basis of the referenced information. There are two kinds of data of consecutive data and name data in the referenceable information. In the case of the name data, the number of names is input into the number-of-classes input windows 607A to 607C as the number of classes so as not to accept user input. In addition, details buttons 608A to 608C are set inactive.

In the case of the consecutive data, the number of classes is numerically input into the number-of-classes input windows 607A to 607C. Although it is an integer value of 2 or more and its upper limit is not particularly determined, it is set to an appropriate numerical value such as, for example, 10, 100 or the like. In the case of the consecutive data, an operation pattern label assignment reference information details input window 611 shown in FIG. 6B is displayed by depressing any of the details buttons 608A to 608C and detailed information for defining a boundary between classes is input. An Add button 609 is a button for increasing the information to be referred to 4 or more and the reference information selection windows 604, the list display buttons 605, the number-of-classes input windows 607 and the details buttons 608 corresponding to information 4, information 5, . . . are sequentially displayed by depressing the Add button 609. At the completion of input including the detailed information, a label definition button 610 is depressed. Owing to this operation, a label confirmation screen shown in FIG. 6C is displayed.

FIG. 6B is an example of a class boundary input screen of the reference information corresponding to any of the depressed details buttons 608A to 608C. Since the consecutive data is set as an object, it is in the form that a value of the class boundary is input. A reference information display window 612, a numerical value range display window 613, and class boundary value input windows 614A to 614E are included in an operation pattern label assignment reference information details input window 611. On the reference information display window 612, the name of the reference information corresponding to any of the depressed details buttons 608A to 608C is displayed. In the drawing, an example of a case that the details button 608B has been depressed on the operation pattern label assignment reference information input window 601 is shown. On the numerical value range display window 613, a range of values of the operation pattern label assignment reference information which have been calculated under a condition of an input cycle with respect to the event signal 103 which has been loaded in advance is displayed.

A numeral which is smaller than a numerical value input through the number-of-classes input windows 607A to 607C by one is displayed on the class boundary value input windows 614A to 614E. In a case where the number of classes is 6, x of a condition that determines a state that a class N (N is 1 to 5) is defined when it is less than x is numerically input. In the example in the drawing, the class 1 is defined when it is less than 1, that is, the class 1 is defined when the state transition frequency is zero. In addition, the class 2 is defined when it is 1 or more and less than 2, that is, the class 2 is defined when the state transition frequency is 1. The classes up to the class 5 are defined in the same way and a condition of the class 6 is for another case, that is, a case that the state transition frequency is 5 or more. At the completion of input, it returns to the operation pattern label assignment reference information input window 601 by depressing an end button 615.

Figure 6C:
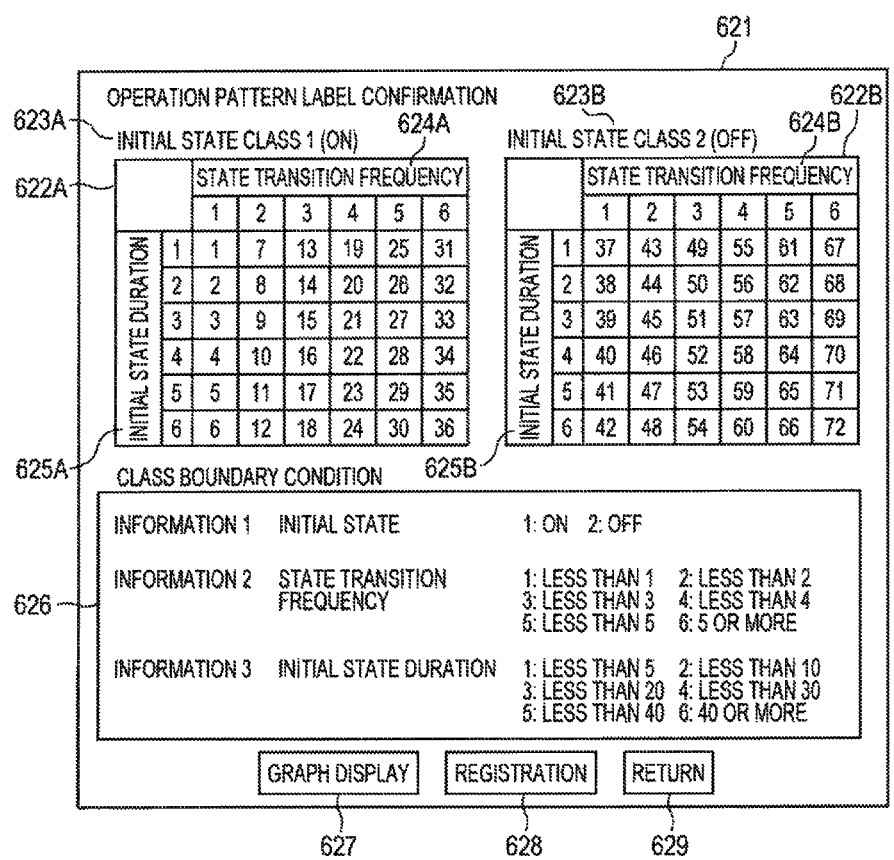
FIG. 6C is an example of a screen for confirming a relation between reference information and a label in the first embodiment of the present invention.

FIG. 6C is an example of a confirmation screen for the label defined in accordance with a result of input in FIG. 6A. An operation pattern label confirmation window 621 is provided with label display windows 622A and 622B and a class boundary condition display window 626. The label display windows 622A and 622B are two-dimensional matrixes and display label numbers corresponding to classes in information indicated on horizontal axis items 624A and 624B and vertical axis items 625A and 625B under conditions 623A and 623B. The number of the windows 622 can be minimized by selecting two pieces of the reference information in descending order of the number of classes and setting them on the horizontal axis items 624A and 624B and the vertical axis items 625A and 625B. All of combinations of the classes of the remaining pieces of reference information are separately described in the conditions 623A and 623B.

The label to be displayed is automatically determined by the following method on the basis of the combinations of classes in respective pieces of information. When a class C1 of information 1, a class C2 of information 2 and a class C3 of information 3 are denoted as (C1, C2, C3), serial numbers starting from 1 are assigned to all of combinations of (1, 1, 2), (1, 1, 3), . . . (1, 1, 6), (1, 2, 1), . . . and (2, 6, 6) as the labels, starting from (1, 1, 1). In this case, since the number of classes of the information 1 is 2, the number of classes of the information 2 is 6 and the number of classes of the information 3 is 6, the total number of labels amounts to 72. In a case where information 4 is to be referred to, all of the combinations of (C1, C2, C3, C4) are counted up in order and serial numbers are allocated to them. Same applies to a case where still another piece of information is to be referred to. Item names of the reference information and conditions for defining classes corresponding thereto are displayed on the class boundary condition display window 626.

Figure 6D:
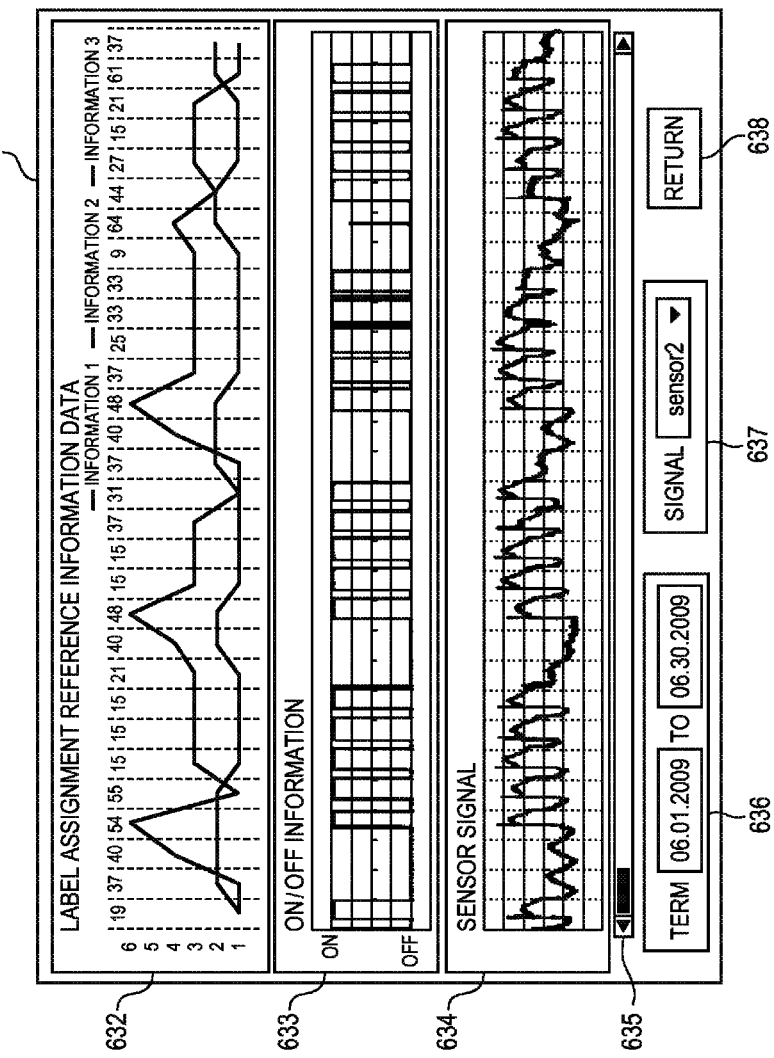
FIG. 6D is an example of a screen for graphically displaying the label, label assignment reference information and the sensor signal in the first embodiment of the present invention.

In a case where the reference information is the name data, respective names are displayed by individually allocating them to the classes for the reference information which has been set through the operation pattern label assignment reference information input window 601 shown in FIG. 6A, and in a case where the reference information is the consecutive data, the class boundary condition which has been input through the operation pattern label assignment reference information details input window 611 shown in FIG. 6B is displayed as it is. A graph display window 631 shown in FIG. 6D is displayed by depressing a graph display button 627. A label assignment condition is decided and registered by depressing a registration button 628. It returns to the operation pattern label assignment reference information input window 601 shown in FIG. 6A by depressing a return button 629.

FIG. 6D is an example of a graph display screen for confirming the labels which have been assigned on the basis of the input condition by relating them to the sensor data. The graph display window 631 includes a label assignment reference information display window 632, an ON/OFF information display window 633 and a sensor signal display window 634.

Prior to graph display, the operation pattern label is assigned under the process flow shown in FIG. 3A by using the sensor signal and the event signal which have been loaded in advance. Class numbers of the information which has been referred for label assignment, that is, the initial state, the state transition frequency and the initial state duration are displayed with line graphs on the label assignment reference information display window 632 and label numbers are displayed superposingly.

ON/OF information obtained by mode division (S303) is displayed on the ON/OFF information display window 633 as a time series graph. The sensor signal selected through a sensor selection window 637 is displayed on the sensor signal display window 634 as a time series graph. A period of data to be displayed on the window is changed by moving a scroll bar 635. The period of the data which is being displayed is displayed on a period display window 636.

On the other hand, the scroll bar 635 is moved in accordance with input by the user and display of the windows 631, 632 and 633 is changed. The graph display window 631 is deleted by depressing a return button 638 and it returns to the operation pattern label confirmation window 621 shown in FIG. 6C.

It is possible to readily input the label assignment conditions by the above-mentioned GUI. Since it is possible to observe the labels which have been assigned using the determined conditions in correspondence with the sensor data, whether the states of the facility in the period that the same labels have been assigned are mutually similar can be confirmed, by which the validity of the label assignment conditions can be confirmed.

Figure 7:
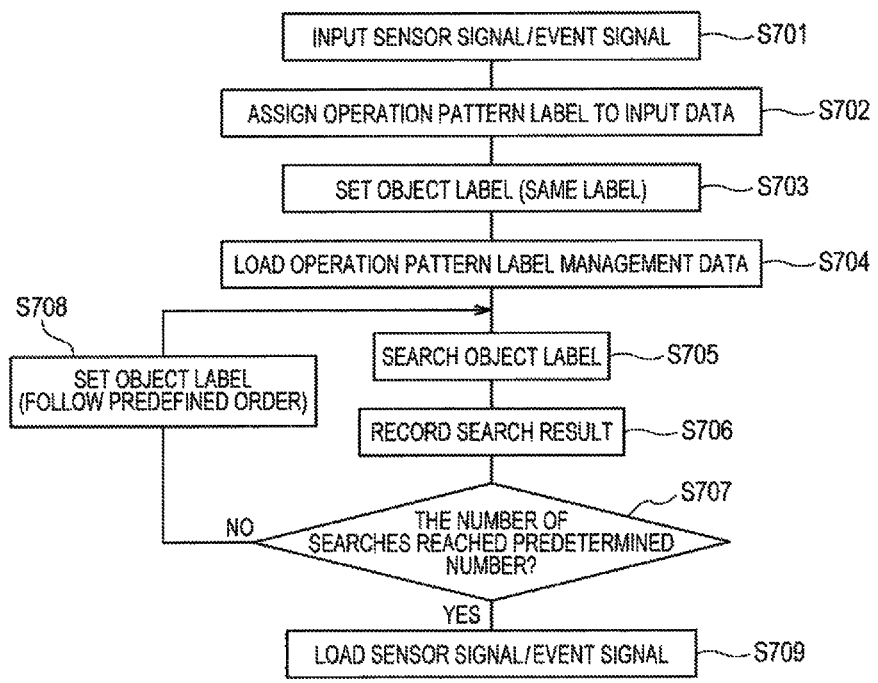
FIG. 7 is a flowchart showing a flow of a learning data selecting process in the first embodiment of the present invention.

Next, a flow of a process by the learning data selection unit 106 will be described using FIG. 7. First, the sensor signal 102 and the event signal 103 are input into the operation pattern label assignment unit 104 (S701), and the operation pattern label is assigned by the operation pattern label assignment unit 104 per previously determined period (S702). Next, a learning data selecting process is performed by the learning data selection unit 106 in the procedure as follows. First, a label which is the same as the assigned label is set as a search object (S703) and the operation pattern label management data of the same site and the same serial number is loaded from the database 105 (S704). Next, the search object label is searched for (S705) and a result of search is recorded (S706). However, data with warning is not set as the search object. In addition, an excluded day may be designated by a file or a user interface so as to make it possible to exclude it from the search object. Further, whether the number of pieces of the searched data reaches a previously defined number is confirmed (S707), when it does not reach the number, the search object label is set (S708) and it returns to step S705.

With respect to each operation pattern label, other labels which are expected to include similar facility states are determined in advance with priority order added, and the search object label is determined in accordance with the priority order in step S708. This is repeated until the learning data reaches a predetermined number, and the sensor signal data and the event signal data to be correlated to the key codes described in the searched operation pattern label management data are loaded in time series order (S709). However, with respect to an amount exceeding the predetermined number in the final search, labels are selected in descending order of newness in the final search object labels such that the total reaches the predetermined number.

By the above-mentioned process, the learning data which is similar to the input data can be selected from within all pieces of the accumulated data. As a result, highly accurate anomaly discrimination is possible and the error caused by learning data insufficiency can be reduced. At that time, since the number of pieces of learning data is limited to the predetermined number, the calculation time is not increased.

Figure 8:
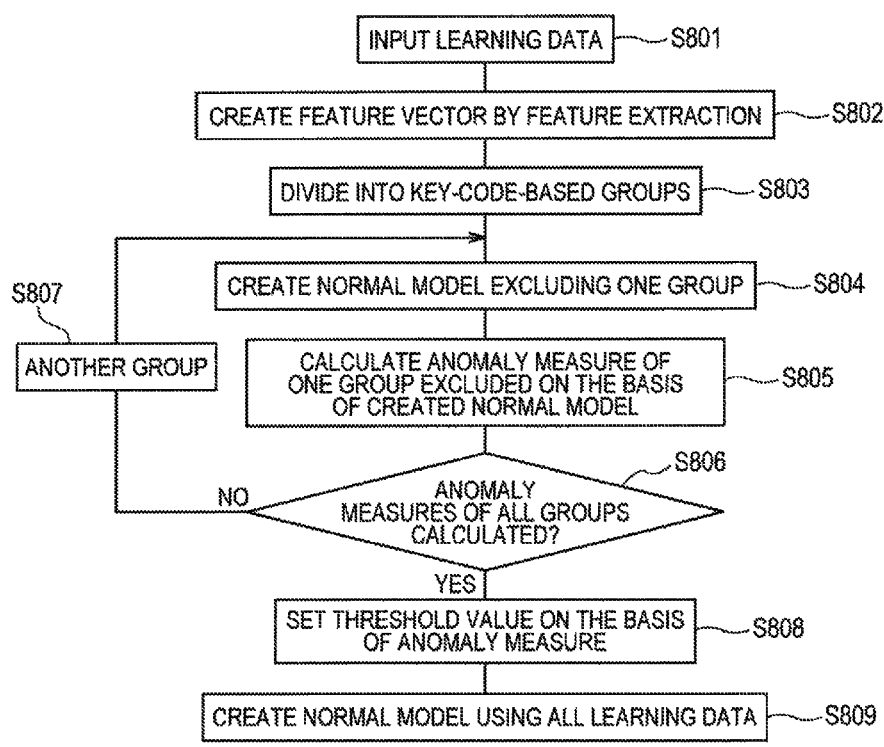
FIG. 8 is a flowchart showing a flow of a normal model creating process in the first embodiment of the present invention.

Next, a flow of a process by the normal model creation unit 107 will be described using FIG. 8. First, the sensor signal data and the event signal data selected by the learning data selection unit 106 are input as the learning data (S801). Next, feature vectors are created by performing feature extraction (S802), they are separated into respective groups in accordance with the key code of the sensor signal data and the event signal data (S803), and learning is performed using the data that one group thereof is excluded to create the normal model (S804). Data of one group excluded in step S804 is input and an anomaly measure is calculated using the created normal model (S805). It is checked to see whether calculation of anomaly measures of data of all groups is terminated (S806), and when not yet terminated, the steps of normal model creation (S804) and anomaly measure calculation (S805) are repeated on the group (S807) whose anomaly measure is not yet calculated. At the completion of calculation of the anomaly measures of the data of all of the groups (S806), a threshold value for discriminating the anomaly is set on the basis of the calculated anomaly measures (S808). Finally, the normal model is created using all pieces of the learning data (S809).

Next, each step will be described in detail.

First, in step S801, the sensor signal is input, and then feature extraction is performed in step S802 to obtain the feature vector. Although it is conceivable to use the sensor signal as it is for feature extraction, it is also possible to provide ±1, ±2, . . . windows for a certain time so as to extract a feature indicating temporal change of data by a feature vector of a window width (3, 5, . . . ) x the number of sensors. In addition, discrete wavelet transform (DMT: Discrete Wavelet Transform) may be performed so as to decompose it into frequency components. Incidentally, canonicalization for transforming the mean so as to be 0 and the variance so as to be 1 may be performed on each feature using a mean and a standard deviation. The mean and standard deviation of each feature are stored such that the same transformation can be performed upon evaluation. Or, canonicalization may be performed using a maximum value and a minimum value or an upper limit and a lower limit which have been set in advance.

These processes are done in order to simultaneously handle the sensor signals which are different in unit and scale. At that time, it is necessary to exclude a sensor signal whose variance is very small and a sensor signal whose variance is monotonically increased as a minimum necessary process.

In addition, it is also conceivable to erase an invalid signal by correlation analysis. This is a method that correlation analysis is performed on a multidimensional time series signal, when similarity is extremely high in that there exist a plurality of signals the correlating value among which is near 1, overlap signal are erased from the plurality of signals because they are redundant and not overlapping ones are retained. In addition, the user may designate them. Further, in step S802, dimension reduction may be performed by various feature transforming techniques such as principal component analysis, independent component analysis, non-negative matrix factorization, projection to latent structure, canonical correlation analysis and so forth.

Next, the learning data is divided into groups in step S803, normal model creation is performed in step S804, and anomaly measure calculation is performed by the anomaly measure calculation unit 108 in step S805.

As a normal model creating technique, a projection distance method (PDM: Projection Distance Method) and a local sub-space method (LSC: Local Sub-space Classifier) are conceivable. The projection distance method is a method of creating a sub-space which has the unique origin to the learning data, that is, an affine sub-space (a space which is maximum in variance).

Figure 9:
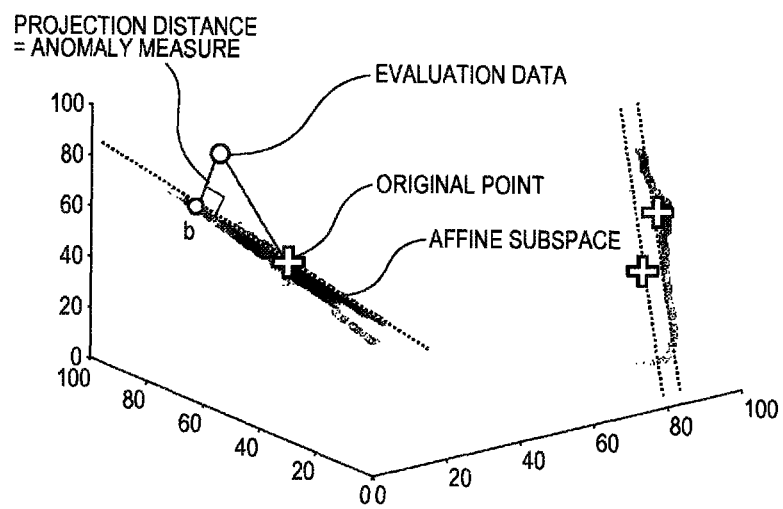
FIG. 9 is a graph for explaining a projection distance method.

The affine sub-space is created cluster by cluster as shown in FIG. 9. Although FIG. 9 shows an example that a one-dimensional affine sub-space is created in a three-dimensional feature space, the dimension of the feature space may be made larger and any dimension is allowed as the dimension of the affine sub-space as long as it is smaller than the dimension of the feature space and smaller than the number of pieces of learning data.

An affine sub-space calculating method will be described. First, a mean μ and a covariance matrix Σ of the learning data are obtained, then an eigenvalue problem of Σ is solved and a matrix U that eigenvectors corresponding to r previously designated eigenvalues are arranged in descending order of value is set as an orthonormal basis of the affine sub-space. The anomaly measure which is calculated on the basis of this normal model is defined as a minimum value of a projection distance d of each cluster to the affine sub-space. Here, it is supposed that the cluster is a collection of pieces of data of respective sections divided into the modes, for example, as shown in FIG. 3B. Or, an unsupervised clustering technique represented by the K-means method may be utilized.

On the other hand, the local sub-space method is a method of creating a k−1 dimensional affine sub-space using k-neighbor data of evaluation data q.

Figure 10:
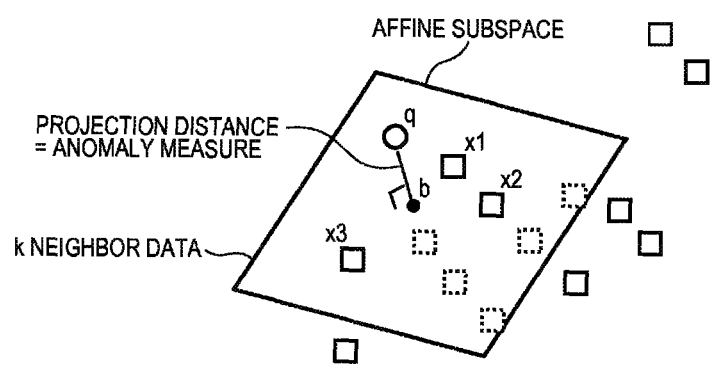
FIG. 10 is an affine sub-space diagram for explaining a local sub-space method.

An example of the case of k=3 is shown in FIG. 10. As shown in FIG. 10, since the anomaly measure is indicated by the projection distance shown in the drawing, a point b on the affine sub-space which is the closest to the evaluation data q may be obtained.

In order to calculate b from the evaluation data and the k-neighbor data xi (i=i, . . . , k) thereof, from a matrix Q that k pieces of q are arranged and a matrix X that pieces of xi are arranged,

[Numerical Formula 1]

$$C=(Q-X)^T(Q-X) \quad \text{(Numerical Formula 1)}$$

a correlation matrix C is obtained thereby,

[Numerical Formula 2]

$$b = \frac{C^{-1}1_n}{1_n^T C^{-1} 1_n} \quad \text{(Numerical Formula 2)}$$

b is calculated thereby.

Since in this method, the affine sub-space cannot be created unless the evaluation data is input, a kd-tree for effectively searching for the k-neighbor data is constructed mode by mode in step S804 and step S809. The kd-tree is a space division data structure for classifying a point in a k-dimensional Euclid space. Division is performed using only a plane vertical to one of coordinate axes so as to configure that one point is stored in each leaf node. In step S805, the k-neighbor data of the evaluation data is obtained by utilizing the kd-tree belonging to the same mode as that of the evaluation data, the aforementioned point b is obtained from them and a distance between the evaluation data and the point b is calculated to be set as the anomaly measure.

Besides this, the normal model can be created by using various methods such as the Mahalanobis Taguchi method, a regression analysis method, a nearest neighbor algorithm, a similarity base model, a one-class SVM and so forth.

Next, in step S808, the threshold value is set on the basis of the anomaly measures. Specifically, the anomaly measures corresponding to pieces of the learning data calculated in S805 are sorted in ascending order and a value which reaches a ratio which has been designated in advance is set as the threshold value. That is, assuming that the number of pieces of data is N and the designated ratio is p, a value which is the Np-th smallest value is set as the threshold value.

Given that the learning unit is configured by the normal data, p must be set to 1.0, and in this case, a maximum value of the anomaly measures is set as the threshold value. At that time, it is better if only data on anomaly measure for the learning data to which the label which is the same as the operation pattern label assigned to the input data as the anomaly discrimination object has been assigned is used without using the anomaly measures for all pieces of the learning data. In addition, threshold value setting may be performed by the same process by dividing the data mode by mode. A mode dividing process may be performed by the normal model creation unit 107 using the aforementioned method and the sensor signal data shown in FIG. 5B may be saved by adding the mode thereto on the basis of a result obtained by the operation pattern label assignment unit 104.

After the normal model has been created by the normal model creation unit 107, the anomaly measure is calculated on the basis of the input sensor signal 102 by the anomaly measure calculation unit 108. After the feature vector has been extracted by the same method as that in step S802, the anomaly measure is calculated by the same method as that in step S805 on the basis of the normal model created in step S809. Next, the anomaly measure calculated by the anomaly measure calculation unit 108 is compared with the threshold value set in step S808, and when it is a value equal to or more than the threshold value, it is detected as the anomaly in the anomaly discrimination unit 109.

Since the operation pattern label is assigned to the data for each fixed interval and then the predetermined number of pieces of data in the period of the same label or the labels which are close in state is collected to set as the learning data upon anomaly detection by the above-described method, the highly accurate normal model can be created without increasing the calculation load and the error that normality is decided as anomaly can be reduced.

Next, in the anomaly diagnosis unit 120, the sensor signal 102 and the event signal 103 from the facility 101 are input and the signal which is output from the anomaly discrimination unit 109 as a result of analysis of the sensor signal 102 and the event signal 103 with the operation pattern label assigned by the sensor signal analysis unit 100 is received, a cause event of the anomaly is estimated from events which have been decided to be anomaly by the anomaly discrimination unit 109, and a result event brought about by this cause event is displayed on a display screen (not shown) of the anomaly diagnosis unit 120. When there exist the plurality of result events, they are displayed on the screen by arranging them in descending order of probabilities. Comparatively fast processing can be attained by the sensor signal analysis unit 100 by processing the sensor signal 102 and the event signal 103 with the operation pattern label assigned and diagnosis processing by the anomaly diagnosis unit 120 can be performed basically by real time processing.

Embodiment 2

In the embodiment 1, the method of selecting the learning data on the basis of the operation pattern label has been described on the assumption that the state of the facility is changed in accordance with the ON/OFF switching pattern, that is, the operation pattern. However, there are cases where the state is greatly changed before and after the maintenance work regardless of the same operation pattern label and there is a possibility that appropriate learning data cannot be selected by the above-described method.

A second embodiment to which a function for coping with such a case is added will be described using FIG. 11. FIG. 11 is a diagram showing a system configuration of the second embodiment which embodies the facility state monitoring method of the present invention. The present system is configured by being provided with a sensor signal analysis unit 1100 and an anomaly diagnosis unit 1120, and an input/output unit 1130.

The sensor signal analysis unit 11100 of the present system is configured by being provided with the operation pattern label assignment unit 104 that assigns the operation pattern label for each fixed interval on the basis of the sensor signal 102 and the event signal 103 output from the facility 101, a macro-feature calculation unit 1101 that calculates a macro-feature from the sensor signal 102 and the event signal 103 to which the label has been assigned by the operation pattern label assignment unit 104, a database 1105 that accumulates the sensor signal 102 and the event signal 103 with the operation pattern label assigned, a leaning data selection unit 1106 that selects the learning data from the sensor signal 102 and the event signal 103 accumulated on the basis of the operation pattern label, a normal model creation unit 1107 that creates the normal model using the selected learning data, an anomaly measure calculation unit 1108 that calculates the anomaly measure on the basis of the normal model and the sensor signal, and an anomaly discrimination unit 1109 that detects anomaly on the basis of the calculated anomaly measure.

The anomaly diagnosis unit 1120 receives the sensor signal 102 and the event signal 103, and an output from the anomaly discrimination unit 1109 and diagnoses the anomaly of the facility 101.

The input/output unit 1130 is connected with the operation pattern label assignment unit 104, the anomaly discrimination unit 1109, the anomaly diagnosis unit 1120 and so forth to input diagnosis conditions and to output a result of diagnosis. The input/output unit 1130 is provided with a display screen 1131.

A difference from the configuration of the first embodiment shown in FIG. 1 lies in that the macro-feature calculation unit 1101 that calculates a feature indicating a macro-fluctuation of the sensor signal 102 is added. After the operation pattern label has been assigned per previously determined period, for example, per day by the operation pattern label assignment unit 104, the sensor signal is cut out per same period and a feature amount is calculated by the macro-feature calculation unit 1101. As the feature amounts, a mean, a variance, a maximum value and a minimum value over the whole period, a mean and a variance at steady ON times in the period, a mean and a variance at steady OFF times in the period and so forth are conceivable.

One example of management data therefor is shown in FIG. 12. The management data is the one that items of the above-mentioned feature amounts, that is, the mean, the variance, the maximum value and the minimum value over the whole period: 1210, the mean and the variance at the steady ON time in the period: 1211 and the mean and the variance at the steady OFF time in the period: 1212 are added to the operation pattern label management data 1201 to 1209 (respectively corresponding to 501 to 509 in FIG. 5A) shown in FIG. 5A. However, the items to be added are not necessarily be all of these three items and any one of them or a combination of two of them may be added.

Next, a learning data selecting process method by the learning data selection unit 106 will be described. Although the learning data is selected basically by the same method as that in the first embodiment, the learning data is selected also using the macro-features in addition to the operation pattern label in a case where there is a possibility that the state of the maintenance work or the like may be greatly changed.

Figure 13:
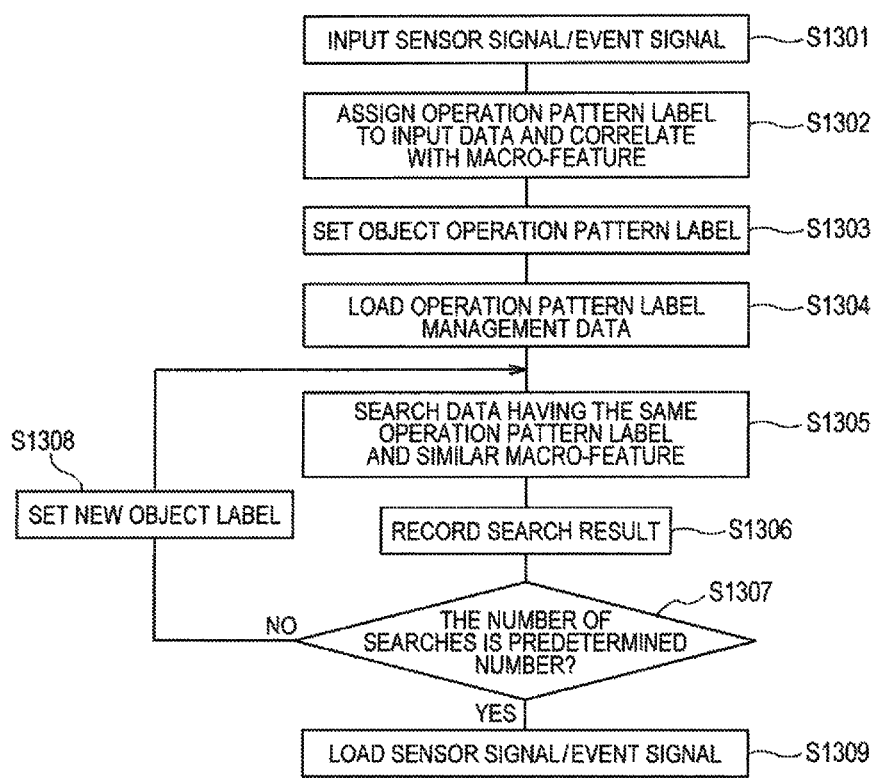
FIG. 13 is a flowchart showing a flow of a learning data selecting process in the second embodiment of the present invention.

Specifically, as shown in a flowchart in FIG. 13, first, into the operation pattern label assignment unit 104, the sensor signal 102 and the event signal 103 are input into the operation pattern label assignment unit 104 (S1301), the operation pattern label is assigned per previously determined period, the macro-feature is calculated by the macro-feature calculation unit 1101 and is saved in correspondence with the operation pattern label (S1302). Next, the learning data selecting process is performed in such procedures as follows by the learning data selection unit 1106.

First, as in the case of the embodiment 1, the operation pattern label is set as the search object on the screens described in FIG. 6A to FIG. 6D (S1303), and pieces of the operation pattern label management data of the same site and the same serial number are loaded from the database 1105 (S1304).

Next, the data which has the same operation pattern label as the operation pattern label assigned in an evaluation object period and is similar in macro-feature is searched from the saved operation pattern label management data (S1305) and a result of search is recorded (S1306). It is assumed that whether the macro-feature is similar is determined on the basis of the threshold value which has been set in advance. However, data with warning is not set as a search object. In addition, the excluded day may be designated by the file or the user interface so as to make it possible to exclude it from the search objects.

Further, whether the number of pieces of the searched data reaches a previously determined number is confirmed (S1307), when the number of pieces of the searched data does not reach the previously determined number, the search object label is changed in accordance with previously set priority order to set a new object label (S1308), and returning to step S1305, data which is similar to the new label and macro-feature is searched for. This is repeated until the learning data reaches the predetermined number, and the sensor signal data and the event signal data correlated to the key code described in the searched operation pattern label management data are loaded in time series order (S1309). With respect to the amount exceeding the predetermined number in the final search, the ones are selected in descending order of similarity in feature in the final search object labels such that the total reaches the predetermined number.

As a process switching method depending on whether the macro-feature is used, several methods are conceivable. A first method is the one that the learning pattern is selected always using the macro-feature without performing switching. This method can be readily feasible because decision conditions are not needed.

A second method is a method that presence/absence of maintenance work is judged on the basis of the event signal, and when the maintenance work is present, the learning pattern is selected using the macro-feature. When signals indicating start and end of the maintenance work are included in the event signal, this method may be adopted. In the absence of the maintenance work, since data may be searched for in descending order of newness, it is possible to terminate the search at a time that it has reached the predetermined number. In a case where there exists a main operation pattern and a large number of the same labels are present, it is expected that search efficiency is improved in comparison with the first method.

A third method is a method that presence/absence of the maintenance work is decided by examining a transition of the macro-feature and when the maintenance work is present, the learning pattern is selected using the macro-feature. For example, when a mean $\mu$ and a standard deviation $\sigma$ of the respective features are calculated in several cycles before the evaluation object period, and if there exists any one of features whose feature values in the evaluation period exceed a range of $\mu \pm n\sigma$, it is decided that a large state change such as the maintenance work has occurred.

Here, the number of cycles to be examined and n are parameters. Or, in a case where with respect to several cycles before the evaluation object period, distances thereof to a cycle which is one before on the feature space are calculated and a distance from the evaluation object period to the cycle which is one before it in the feature space is larger than a maximum value of them, it is decided that the large state change such as the maintenance work has occurred.

In addition, the center of gravity and a covariance of a macro feature space may be calculated with respect to the several cycles before the evaluation object period so as to decide it with a Mahalanobis distance. And an existing one class discrimination technique may also be utilized by using the one in the several cycles before the evaluation object period as the learning data of correct examples.

By the above processing, even in a case where there was a large change in the state of the facility such as the maintenance work, it becomes possible to select learning data which is close to the state of the facility and it becomes possible to create the high accuracy normal model, and as a result it becomes possible to reduce the error caused by learning data insufficiency.

However, in the above-mentioned method, it is supposed that such a case may occur that the number of pieces of data which have the same operation pattern label or labels which are close in state and are similar in macro feature extracted from the sensor signals does meet the predetermined number. In order to cope with this case, in a case where the number of pieces of data which are similar in macro feature is small, the processes succeeding to learning data selection are executed by excluding a sensor which is thought to be changed by the maintenance work.

Whether it has been changed by the maintenance work is determined depending on whether the feature value in the evaluation period exceeds the range of $\mu \pm n\sigma$ by calculating the mean $\mu$ and the standard deviation $\sigma$ of the respective features as described above. Or, it is determined depending on whether a difference between the feature in the evaluation period and that in a cycle which is one before amounts to a maximum which has been ever attained by calculating the difference between respective features in it and the cycle which is one before.

Embodiment 3

In the above-described embodiments 1 and 2, it is assumed that the sensor signals and the event signals output from the facility are saved by assigning the operation pattern labels to all of them. However, in this method, such a problem occurs that the capacity of the database is increased as years go by. In order to solve this problem, it is conceived to delete redundant data. The ones which are same in label and whose number exceeds a previously set number which is larger than the number to be selected as the learning data are set as deletion objects and whether they are to be deleted is determined in units of operation pattern label management data.

Basically, data which is little in influence when deleted is deleted. That is, the data is deleted after confirming that there exists another similar data and no change occurs in result even when actually deleted.

For example, among them that a distance of the macro-feature up to the nearest neighbor data on the feature space is minimized, the one which is smaller in distance to the second nearest data is deleted. Or, pieces of data of the same label are used, clustering is performed using the macro-feature, and the one which is older in date is deleted from the cluster which is larger in number of pieces of data belonging thereto. Or, the anomaly measure is calculated by cross validation that all pieces of data of the same label are used and set as the learning data by excluding the evaluation object data, and data in a period that a maximum value of the anomaly measures is minimized is deleted.

In addition, anomaly measure calculation by the above-mentioned cross validation is performed by excluding data period by period from pieces of data of the same label and data among the excluded period which is the least in change of a calculation result of the anomaly measure may be deleted.

After the deletion object is settled, the sensor signal data and the event signal data correlated to the management data thereof are completely deleted from the database. The management data is not deleted and a numerical value indicating that the data has been deleted, for example, 0 is input into the key code column.

By the above-mentioned method, the high-accuracy normal model can be created without increasing the calculation load and the effect of reducing the database capacity can be also obtained.

INDUSTRIAL APPLICABILITY

The present invention can be utilized in preventive maintenance that the anomaly is detected early on the basis of the multidimensional time series data that the plants and facilities such as the power supply facilities such as the gas turbines and so forth, the facilities which supply the district heating hot water utilizing the waste heat and so forth of the gas turbines, the facilities which supply the high pressure steam and the low pressure steam to the factories, the water wheels in the hydroelectric power plants, the nuclear reactors of the nuclear power plants, the windmills of the wind farms, the engines of the airplanes and the heavy machines, the railroad vehicles and the railroad tracks, the escalators, the elevators and so forth output.

REFERENCE SIGNS LIST 100, 1100 . . . sensor signal analysis unit, 101 . . . facility, 102 . . . sensor signal, 103 . . . event signal, 104 . . . operation pattern label assignment unit, 105, 1105 . . . database, 106, 1106 . . . learning data selection unit, 107, 1107 . . . normal model creation unit, 108, 1108 . . . anomaly measure calculation unit, 109, 1109 . . . anomaly discrimination unit, 120, 1120 . . . anomaly diagnosis unit.

The invention claimed is:

1. A facility state monitoring method of monitoring a state of a facility on the basis of a time series signal that the facility outputs, the method including the steps of:
assigning an operation pattern label for each fixed interval on the basis of the time series signal;
selecting learning data on the basis of the operation pattern label for each fixed interval;
creating a normal model on the basis of the selected learning data;
calculating an anomaly measure on the basis of the time series signal and the normal model; and
discriminating whether the state of the facility is anomaly or normal on the basis of the calculated anomaly measure;
wherein as the operation pattern label, different operation pattern labels are assigned to a steady off state of the facility, a steady on state of the facility, a start-up operation state of the facility and a shut down operation state of the facility.

2. The facility state monitoring method according to claim 1, wherein in the step of creating, the normal model is created for the operation pattern label for each fixed interval.

3. A facility state monitoring method of monitoring a state of a facility on the basis of a time series signal that the facility outputs, including the steps of:
assigning an operation pattern label which has been categorized to a finite number to the time series signal for each fixed interval;
accumulating the time series signal to which the operation pattern label has been assigned in the operation pattern label assigning step as data;
selecting a predetermined number of pieces of data from within the data accumulated in the data accumulating step on the basis of the operation pattern label assigned to the time series signal and setting them as learning data,
creating a normal model by using the learning data selected in the learning data selecting step;
calculating an anomaly measure of the time series signal on the basis of comparison with the normal model created in the normal model creating step; and
discriminating anomaly on the basis of the anomaly measure calculated in the anomaly measure calculating step.

4. The facility state monitoring method according to claim 3, wherein in the step of selecting, the predetermined number of pieces of data of operation pattern labels which are the same as or close in state to the operation pattern label assigned to the timed sequence signal is selected and set as the learning data.

5. The facility state monitoring method according to claim 3, wherein the step of assigning includes a sub-step of calculating a plurality of operation pattern features which include a steady off state of the facility, a steady on state of the facility, an start-up operation state of the facility and a shut down operation state of the facility for each fixed interval, and a sub-step of assigning the operation pattern label on the basis of a combination of the plurality of operation pattern features.

6. The facility state monitoring method according to claim 3, further including a step of calculating a feature indicating a macro-fluctuation of the time series signal for each fixed interval, wherein in the step of learning, the predetermined number of pieces of data is selected from within the accumulated data on the basis of the operation pattern label assigned to the time series signal and the calculated macro-feature and is set as the learning data.

7. The facility state monitoring method according to claim 6, wherein in the step of selecting, the predetermined number of pieces of data of operation pattern labels which are the same as or close in state to the operation pattern label assigned to the time series signal and similar in macro-feature relating to the time series signal is selected from within the accumulated data and set as the learning data.

8. The facility state monitoring method according to claim 6, wherein in the step of learning, presence/absence of a noticeable state change is determined on the basis of the time series signal, in a case where the noticeable state change is not present, the predetermined number of pieces of data of the operation pattern labels which are the same as or close in state to the operation pattern label assigned to the time series signal is selected from within the accumulated data and set as the learning data, and in a case where the noticeable stage change is present, the predetermined number of pieces of data of the operation pattern labels which are the same as or close in state to the operation pattern label assigned to the time series signal and similar in macro-feature relating to the time series signal is selected from within the accumulated data and set as the learning data.

9. The facility state monitoring method according to claim 6, wherein the macro-feature includes at least any one of a mean, a variance, a maximum value and a minimum value over a whole period, or a mean and a variance at steady ON times in the period, or a mean, a variance at steady OFF times in the period of sensor signals.

10. The facility state monitoring method according to claim 8, wherein in the step of learning, decision as to presence/absence of the noticeable state change is made on the basis of a change in the macro-feature.

11. A facility state monitoring device, comprising:
  a sensor signal analysis unit that inputs and analyzes a time series signal output from a facility;
  an anomaly diagnosis unit that receives a result of analysis by the sensor signal analysis unit and the time series signal and diagnoses anomaly of the facility; and
  an input/output unit which is connected with the sensor signal analysis unit and the anomaly diagnosis unit to input and output data,
  wherein the sensor signal analysis unit has an operation pattern label assigning sub-unit that assigns an operation pattern label for each fixed interval on the basis of the time series signal output from the facility, a learning data creation sub-unit that selects learning data on the basis of the operation pattern label which has been assigned by the operation pattern label assigning sub-unit for each fixed period, a normal model creation sub-unit that creates a normal model on the basis of the learning data created by the learning data creation sub-unit, an anomaly measure calculation sub-unit that calculates an anomaly measure of the time series signal output from the facility on the basis of the normal model created by the normal model creation sub-unit, and an anomaly discrimination sub-unit that performs discrimination as to whether the state of the facility is anomaly or normal on the basis of the anomaly measure calculated by the anomaly measure calculation sub-unit;
  further comprising a database sub-unit that stores the time series signal to which the operation pattern label has been assigned by the operation pattern label assigning sub-unit, wherein the learning data creation sub-unit selects pieces of data of the same operation pattern label or operation pattern labels which are close in state from within data accumulated in the database sub-unit by a predetermined number on the basis of the operation pattern label which has been assigned to the time series signal by the operation pattern label assigning sub-unit and sets as the learning data.

12. A facility state monitoring device for monitoring a facility state by inputting a time series signal output from a facility, comprising:
  an operation pattern label assigning unit that inputs the time series signal and assigns an operation pattern label categorized to a finite number to the externally input time series signal for each fixed interval;
  a data accumulation unit that accumulate the time series signal to which the operation pattern label has been assigned by the operation pattern label assigning unit;
  a learning data selection unit that selects pieces of data of the same operation pattern label or operation pattern labels which are close in state by a predetermined number from within the data accumulated in the data accumulation unit on the basis of the label assigned to the time series signal by the operation pattern label assigning unit and sets as learning data;
  a normal model creation unit that creates a normal model using the learning data selected by the learning data selection unit;
  an anomaly measure calculation unit that compares the time series signal to which the operation pattern label has been assigned by the operation pattern label assigning unit with the normal model created by the normal model creation unit and calculates an anomaly measure of the time series signal; and
  an anomaly discrimination unit that performs discrimination of anomaly of the time series signal to which the operation pattern label has been assigned on the basis of the anomaly measure calculated by the anomaly measure calculation unit.

13. The facility state monitoring device according to claim 12, further comprising an input unit that inputs conditions for assigning the operation pattern label to the operation pattern label assigning unit.

* * * * *